US010670785B2

(12) United States Patent
Kim et al.

(10) Patent No.: US 10,670,785 B2
(45) Date of Patent: Jun. 2, 2020

(54) OPTICAL FILTER, AND IMAGING DEVICE COMPRISING SAME

(71) Applicant: LMS Co., Ltd., Pyeongtaek-si (KR)

(72) Inventors: Joo Young Kim, Suwon-si (KR); Seon Ho Yang, Seoul (KR); Hong Seok Chin, Yongin-si (KR); Min Soo Lee, Uiwang-si (KR)

(73) Assignee: LMS CO., LTD., Pyeongtaeksi (KR)

( * ) Notice: Subject to any disclaimer, the term of this patent is extended or adjusted under 35 U.S.C. 154(b) by 62 days.

(21) Appl. No.: 14/917,018

(22) PCT Filed: Aug. 30, 2014

(86) PCT No.: PCT/KR2014/008109
§ 371 (c)(1),
(2) Date: May 10, 2016

(87) PCT Pub. No.: WO2015/034217
PCT Pub. Date: Mar. 12, 2015

(65) Prior Publication Data
US 2016/0259103 A1  Sep. 8, 2016

(30) Foreign Application Priority Data

Sep. 6, 2013 (KR) .................. 10-2013-0107119
Feb. 12, 2014 (KR) .................. 10-2014-0016094

(51) Int. Cl.
G02B 5/28 (2006.01)
G02B 5/22 (2006.01)
G02B 5/20 (2006.01)

(52) U.S. Cl.
CPC ............. G02B 5/282 (2013.01); G02B 5/208 (2013.01); G02B 5/223 (2013.01)

(58) Field of Classification Search
CPC .. G02B 5/281; G02B 5/282–288; G02B 5/22; G02B 5/223; G02B 5/226; G02B 5/208; G02B 5/206
(Continued)

(56) References Cited

U.S. PATENT DOCUMENTS

2010/0321770 A1  12/2010  Pyo et al.
2012/0145901 A1*  6/2012  Kakiuchi ............... G02B 5/208
                                           250/330
2016/0252664 A1  9/2016  Kim et al.

FOREIGN PATENT DOCUMENTS

CN          1836176 A      9/2006
CN        101750654 A      6/2010
(Continued)

OTHER PUBLICATIONS

Machine English language translation of Asano et al. JP2011-100084.*
(Continued)

Primary Examiner — Marin Pichler
(74) Attorney, Agent, or Firm — Polsinelli PC

(57) ABSTRACT

An optical filter comprising a light absorption layer and a near-infrared reflection layer, and an imaging device comprising the optical filter are provided. Wherein the light absorption layer has an absorption maximum in a wavelength range of 670 to 720 nm, a wavelength at which the near-infrared reflection layer has a light transmittance of 50% is in a range of 690 to 720 nm, and the optical filter satisfies the following Mathematical Formula 1:

$$\Delta E^* \leq 1.5 \qquad \text{[Mathematical Formula 1]}$$

wherein the $\Delta E^*$ value represents a color difference between light that is incident in a vertical direction of the optical filter and passes through the optical filter (Continued)

and light that is incident at an angle of 30° with respect to the vertical direction of the optical filter and passes through the optical filter.

7 Claims, 5 Drawing Sheets

(58) Field of Classification Search
USPC ................................ 359/350, 355, 356, 359
See application file for complete search history.

(56) References Cited

FOREIGN PATENT DOCUMENTS

| | | |
|---|---|---|
| CN | 102262254 A | 11/2011 |
| JP | 2006-085196 | 3/2006 |
| JP | 2006-106570 | 4/2006 |
| JP | 2006-106570 A | 4/2006 |
| JP | 2006-184892 | 7/2006 |
| JP | 2008-106836 | 5/2008 |
| JP | 2011-100084 | 5/2011 |
| JP | 2012-008532 | 1/2012 |
| JP | 2012-185468 | 9/2012 |
| JP | 2013-050593 | 3/2013 |
| JP | 2013-50593 A | 3/2013 |
| KR | 10-2010-0137229 | 12/2010 |
| WO | WO 2015/034211 | 3/2015 |
| WO | WO 2015/034217 | 3/2015 |

OTHER PUBLICATIONS

Office Action dated Apr. 1, 2017 in the corresponding Chinese Patent Application No. 201480049125.1.

International Search Report and the Written Opinion dated Dec. 16, 2014 From the Korean Intellectual Property Office Re. Application No. PCT/KR2014/008109 and Its Translation of Search Report in English.

International Search Report and the Written Opinion dated Dec. 17, 2014 From the Korean Intellectual Property Office Re. Application No. PCT/KR2014/008074 and Its Translation of Search Report in English.

Translation of Third Party Observation and Additional Comments dated Dec. 14, 2015 From the Korean Intellectual Property Office Re. Application No. PCT/KR2014/008074.

Translation of Third Party Observation and Additional Comments Dated Dec. 28, 2015 From the Korean Intellectual Property Office Re. Application No. PCT/KR2014/008074.

* cited by examiner

OPTICAL FILTER, AND IMAGING DEVICE COMPRISING SAME

RELATED APPLICATIONS

This application is a National Phase of PCT Patent Application No. PCT/KR2014/008109 having International filing date of Aug. 30, 2014, which claims the benefit of priority of Korean Patent Applications Nos. 10-2013-0107119 filed on Sep. 6, 2013 and 10-2014-0016094 filed on Feb. 12, 2014. The contents of the above applications are all incorporated by reference as if fully set forth herein in their entirety.

BACKGROUND

Field and Background of the Invention

The present invention relates to an optical filter and an imaging device including the same.

Background Art

Imaging devices such as cameras use a CMOS sensor to convert incident light into electronic signals, thereby forming images. To realize high-quality images with the high pixel counts of the cameras, a newly developed back side illuminated-type (BSI-type) CMOS sensor has been applied to main stream cameras instead of a front side illuminated-type (FSI-type) CMOS sensor. In the FSI-type CMOS sensor, an effect occurs where some of the light is blocked by wirings formed on a top surface of a photodiode (PD). On the other hand, the BSI-type CMOS sensor may receive a larger amount of incident light compared to the FSI-type CMOS sensor since the wirings are disposed under the photodiode to receive a larger amount of light, and thus has an effect of increasing the intensity of an image by 70% or more. Therefore, the BSI-type CMOS sensors are generally applied in most cameras with over eight million pixels.

The BSI-type CMOS sensor has a structure in which light having a larger angle of incidence can also reach the photodiode compared to that in the FSI-type CMOS sensor.

In general, the CMOS sensor may also detect light in a wavelength region which cannot be observed with the naked eye. Since an image is distorted by the light in such a wavelength region, colors different from those perceived with the naked eye are perceived. To prevent such a distortion, an optical filter is used in front of the CMOS sensor. However, the conventional optical filter has a problem in that the transmission spectrum of the optical filter varies as the angle of incidence of the light varies, thereby resulting in distorted images.

Prior-art Document (Patent Document 1) Japanese Patent Laid-open Publication No. 2008-106836

SUMMARY OF THE INVENTION

Technical Problem

Therefore, the present invention is directed to providing an optical filter capable of reducing a color difference due to an angle of incidence of light to enhance color reproduction characteristics.

Also, the present invention is directed to providing an imaging device including the optical filter.

Technical Solution

To solve the above problem, one aspect of the present invention provides an optical filter including a light absorption layer and a near-infrared reflection layer. Here, the light absorption layer may have an absorption maximum in a wavelength range of 670 to 720 nm, a wavelength at which the near-infrared reflection layer has a light transmittance of 50% is in a range of 690 to 720 nm, and the optical filter satisfies the following Mathematical Formula 1.

$$\Delta E^* \leq 1.5 \qquad \text{[Mathematical Formula 1]}$$

In Mathematical Formula 1, $\Delta E^*$ represents a color difference between light that is incident on the optical filter in a vertical direction and passes through the optical filter and light that is incident at an angle of 30° with respect to the vertical direction of the optical filter and passes through the optical filter.

Another aspect of the present invention provides an imaging device including the optical filter according to one exemplary embodiment of the present invention.

Effect of the Invention

Such an optical filter can be useful in preventing a shift in a transmission spectrum due to a change in an angle of incidence of light without decreasing the transmittance in a visible region.

DESCRIPTION OF SPECIFIC EMBODIMENTS OF THE INVENTION

Figure 1:
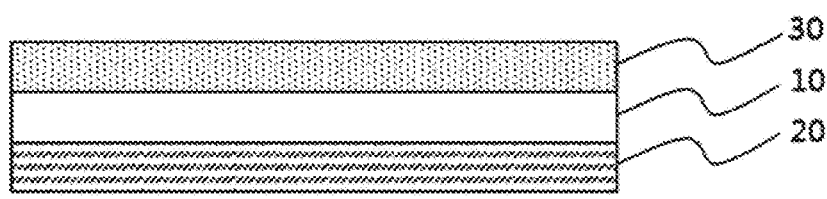
FIG. 1 is a cross-sectional view showing a stacked structure of an optical filter according to one exemplary embodiment of the present invention.

Hereinafter, the term "angle of incidence" used in the present invention refers to an angle of light incident on an optical filter with respect to the vertical direction of the optical filter. A required quantity of incident light increases as the number of pixels in an imaging device increases. Therefore, the latest imaging devices need to receive light incident on the optical filter in the vertical direction as well as light incident at an angle of 30° or more with respect to the vertical direction.

Meanwhile, in the present invention, the term "$\Delta E^*$" refers to a color difference between light that is incident on an optical filter in a vertical direction and passes through the optical filter and light that is incident at an angle of 30° with respect to the vertical direction of the optical filter and passes through the optical filter.

In general, the light passing through the optical filter may be divided into a component substantially parallel with incident light and a scattered component. In this case, transmittance of the component substantially parallel with the incident light is referred to as direct transmittance, and transmittance of the scattered component is referred to as diffuse transmittance. Generally, transmittance of light is a concept that encompasses the direct transmittance and the diffuse transmittance, however in the present invention, the transmittance of light is used as a concept to denote only the direct transmittance.

Specifically, the $\Delta E^*$ is a color value specified by the Commission International de l'Eclairage (CIE) and is used to denote a concept used in the CIE Lab color space, the concept of which is cited in the present invention. The CIE Lab color space is a color coordinate space in which a difference in color that can be perceived by human eyesight may be expressed. A distance between two colors in the CIE Lab color space is designed to be in proportion to a difference between the corresponding colors recognized by humans.

The term "color difference" in the CIE Lab color space refers to a distance between two colors in the CIE Lab color space. That is, a larger distance means that there is a greater color difference, and a smaller distance means that there is smaller color difference. Such a color difference may be indicated by $\Delta E^*$.

Any position in the CIE color space may be represented by three coordinate values, that is, $L^*$, $a^*$ and $b^*$. The $L^*$ value represents a brightness. In this case, $L^*$ represents black when $L^*$ is 0 and represent white when $L^*$ is 100. The $a^*$ value represents a level of bias of a color corresponding to the color coordinates toward either pure magenta or pure green, and the $b^*$ value represents a level of bias of a color corresponding to the color coordinates toward either pure yellow or pure blue.

The range of $a^*$ is $-a$ to $+a$. The maximum value ($a^*$ max) of $a^*$ represents pure magenta, and the minimum value ($a^*$ min) of $a^*$ represents pure green. For example, a negative value of $a^*$ represents a color closer to pure green, and a positive value represents a color closer to pure magenta. When $a^*=80$ is compared to $a^*=50$, $a^*=80$ is closer to pure magenta compared to $a^*=50$.

The range of $b^*$ is $-b$ to $+b$. The maximum value ($b^*$ max) of $b^*$ represents pure yellow, and the minimum value ($b^*$ min) of $b^*$ represents pure blue. For example, a negative value of $b^*$ represents a color closer to pure yellow, and a positive value represents a color closer to pure blue. When $b^*=50$ is compared to $b^*=20$, $b^*=50$ is closer to pure yellow compared to $b^*=20$.

Typically, the color difference is hardly recognized by human eyesight when the $\Delta E^*$ value is less than or equal to 1.5, and the color difference may not be recognized by human eyesight at all when the $\Delta E^*$ value is less than or equal to 0.5. However, the color difference may be recognized by human eyesight when the $\Delta E^*$ is greater than 1.5, and the color difference may be clearly recognized by human eyesight when the $\Delta E^*$ value is greater than or equal to 2.0. For example, when products are produced in a factory, the maintenance of the $\Delta E^*$ value in a range of 0.8 to 1.2 means that a deviation of color between the products is managed to an extent such that the deviation cannot be recognized by human eyesight.

The color difference $\Delta E^*$ between any color E1 having color coordinates ($L1^*$, $a1^*$, $b1^*$) and another color E2 having color coordinates ($L2^*$, $a2^*$, $b2^*$) may be calculated by the following Mathematical Formula a.

$$\Delta E^* = \sqrt{(\Delta L^*)^2 + (\Delta a^*)^2 + (\Delta b^*)^2}$$

In Mathematical Formula a, $\Delta L^*$ represents a difference between $L1^*$ and $L2^*$ in the color coordinates of any two colors E1 and E2. Also, $\Delta a^*$ represents a difference between $a1^*$ and $a2^*$ in the color coordinates of the colors E1 and E2, and $\Delta b^*$ represents a difference between $b1^*$ and $b2^*$ in the color coordinates of the colors E1 and E2.

In the present invention, the term "dynamic range of a visible region" refers to a range of light that can be accurately represented on a screen by a CMOS sensor.

When light in an infrared region irrelevant to the color expression passes through the optical filter and is incident on a CMOS sensor, a dynamic range of the visible region required to express colors may be narrowed. When the dynamic range of the visible region is narrowed, it is impossible to distinguish an image in a dark region, which makes it difficult to realize an accurate image. Therefore, the optical filter has to minimize light transmittance in the infrared region. In the CMOS sensor, noise is generally generated by the circuit structure. Particularly, thermal noise is mainly caused by the circuit structure. Since the light of the infrared region passing through the optical filter acts as a leading cause of heat generation in the CMOS sensor, the optical filter has to minimize light transmittance in the infrared region.

The present invention is directed to an optical filter. By way of an example, the optical filter is characterized in that it may include a light absorption layer and a near-infrared reflection layer. Here, the maximum-absorption wavelength of the light absorption layer may be in a wavelength range of 670 to 720 nm, a wavelength at which the near-infrared reflection layer has a light transmittance of 50% may be in a wavelength range of 690 to 720 nm, and the optical filter satisfies the following Mathematical Formula 1.

$$\Delta E^* \leq 1.5 \qquad \text{[Mathematical Formula 1]}$$

In Mathematical Formula 1, $\Delta E^*$ represents a color difference between light that is incident on the optical filter in a vertical direction and passes through the optical filter and light that is incident at an angle of 30° with respect to the vertical direction of the optical filter and passes through the optical filter.

The light absorption layer of the optical filter has an absorption maximum in a wavelength range of 670 to 720 nm. This may be achieved by adjusting the type and content of a light absorbing agent included in the light absorption layer. Also, in the near-infrared reflection layer of the optical filter, a wavelength at which the light transmittance is 50% is in a wavelength range of 690 to 720 nm. This may be achieved by adjusting the thickness and stacked structure of a dielectric multilayer used to form the near-infrared reflection layer. When the maximum-absorption wavelength of the light absorption layer and the wavelength at which the near-infrared reflection layer has a light transmittance of 50% are controlled within these ranges, even when an angle of incidence of light incident on the optical filter is changed, a distortion of an image caused accordingly may be prevented, and it is possible to reproduce colors with the same accuracy as in an image observed with the naked eye.

This may be confirmed by Mathematical Formula 1.

Specifically, in Mathematical Formula 1, $\Delta E^*$ represents a color difference calculated by applying to Mathematical Formula 1 the color coordinates ($L1^*$, $a1^*$, $b1^*$) of light E1 which is incident on the optical filter according to one exemplary embodiment of the present invention in the vertical direction and passes through the optical filter and the color coordinates (L2*, a2*, b2*) of light E2 which is incident at an angle of 30° with respect to the vertical direction of the optical filter and passes through the optical filter.

As described above, when an optical filter is realized such that a color difference (ΔE*) is less than or equal to 1.5, a distortion of colors present in an image represented on a display device becomes unrecognizable by human eyesight.

For example, the ΔE* value may be in a range of 0.001 to 1.5, 0.001 to 1.2, 0.001 to 1.0, or 0.001 to 0.8.

According to another exemplary embodiment, in the optical filter, an absolute value ($\Delta T_{30\%}$) of a difference between a wavelength at which the transmittance of light incident in the vertical direction is 50% in a wavelength range of 600 to 750 nm and a wavelength at which the transmittance of light incident at an angle of 30° with respect to the vertical direction is 30% may be less than or equal to 15 nm.

This may mean the transmittance of the light in a wavelength range of 600 to 750 nm by the optical filter. Specifically, this may mean that the absolute value of the difference between wavelength of light incident on the optical filter in the vertical direction and wavelength of light incident at an angle of 30° with respect to the vertical direction with a transmittance value of 30% is less than or equal to 15 nm. For example, the absolute value of the difference between the wavelengths may be in a range of 1 nm to 15 nm, 1 nm to 8 nm, or 1 nm to 5 nm. In this way, even though an angle of incidence of light incident on the optical filter through a lens of a solid imaging device, etc. may be changed, distortion of an image thereby caused may be prevented, thus making it possible to reproduce colors at the same accuracy as in an image observed with the naked eye. Also, when the absolute value of the difference between the wavelengths is controlled within this range to minimize the color difference, the color difference may be controlled to an extent of being unrecognizable by human eyesight.

According to another exemplary embodiment, the optical filter according to one exemplary embodiment of the present invention may have an average transmittance of 80% or more for light in the visible region (450 to 600 nm).

When the optical filter is applied to an imaging device or a camera module, the optical filter may have a high light transmittance in the visible region. When the optical filter has an average transmittance of 80% or more in the visible region, images represented by the imaging device or the camera module to which the optical filter is applied may be represented at the same color accuracy as in images observed with the naked eye.

According to still another exemplary embodiment, the optical filter according to one exemplary embodiment of the present invention may have an average transmittance of 10% or less for light in the infrared region (750 to 1,000 nm).

Specifically, the above-described condition may mean that the transmittance of the light of the infrared region by the optical filter is less than or equal to 10%. When the transmittance of the light of the infrared region by the optical filter is controlled within this range, a decrease in the dynamic range of the visible region, an increase in noise, and decreases in color reproduction characteristics and resolution may be prevented.

According to another exemplary embodiment, the light absorption layer of the optical filter may include a binder resin and a light absorbing agent dispersed in the binder resin. For example, the binder resin is not particularly limited as long as the light absorbing agent of the binder resin is easily dispersed. For example, at least one selected from the group consisting of a cyclic olefin-based resin, a polyarylate resin, a polysulfone resin, a polyether sulfone resin, a poly(para-phenylene) resin, a polyarylene ether phosphine oxide resin, a polyimide resin, a polyetherimide resin, a polyamideimide resin, an acrylic resin, a polycarbonate resin, a polyethylene naphthalate resin, and various organic-inorganic hybrid resins may be used as the binder.

A least one selected from the group consisting of various types of dyes, pigments or metal complex compounds may be used as the light absorbing agent, but the present invention is not particularly limited thereto. For example, a cyanine-based compound, a phthalocyanine-based compound, a naphthalocyanine-based compound, or a dithiol metal complex compound may be used as the light absorbing agent.

The light absorbing agent may be used alone. In some cases, the light absorbing agent may be used in a combination of two or more or formed in two divided layers.

The content of the light absorbing agent may, for example, be in a range of 0.001 to 10 parts by weight, 0.01 to 10 parts by weight, or 0.1 to 5 parts by weight based on 100 parts by weight of the binder resin. When the content of the light absorbing agent is controlled within this range, a shift in the transmission spectrum due to an angle of incidence may be corrected, and a superior near-infrared blocking effect may be achieved. Also, when the light absorbing agent is used in a combination of two or more, an absorption wavelength range (full width at half maximum (FWHM)) of the light absorption layer may increase, thereby minimizing the transmission of light that may occur in a wavelength range of the near-infrared region.

According to another exemplary embodiment, the optical filter may satisfy the following Mathematical Formula 2.

$$t_{abs} \leq 0.13 \ \mu m \qquad \text{[Mathematical Formula 2]}$$

In Mathematical Formula 2, $t_{abs}$ represents a thickness of a light absorbing agent layer when the light absorbing agent layer is formed to have the same area as the light absorption layer using the same amount of the light absorbing agent as the light absorbing agent included in the light absorption layer.

Specifically, the light absorption layer of the optical filter includes a binder resin and a light absorbing agent. Here, thickness ($t_{abs}$) of the light absorbing agent layer when the light absorbing agent layer is formed using the same amount of the light absorbing agent as the light absorbing agent included in the light absorption layer may refer to a concentration and content of the light absorbing agent in the light absorption layer. When the $t_{abs}$ value is less than or equal to 0.13 μm, the above-described color difference (ΔE*) may be less than or equal to 0.8. For example, the color difference may be in a range of 0.1 to 0.8, 0.4 to 0.8, or 0.5 to 0.6. As described above, when the ΔE* value of the optical filter is controlled to be 0.8 or less, distortion of colors present in an image represented on a display device including the optical filter may not be recognized by human eyesight.

In the optical filter according to one exemplary embodiment of the present invention, when the light absorption layer has a predetermined maximum-absorption wavelength and thickness, the color difference (ΔE*) of the optical filter varies as the reflection characteristics of the near-infrared reflection layer included in the optical filter vary. Specifically, among the characteristics of the near-infrared reflection layer, when the wavelength W1 at which the transmittance is 50% varies, the color difference (ΔE*) varies. In this case, when W1 is optimized so that ΔE* is a minimum value, distortion of images may be prevented.

The light absorption layer may have a thickness of 1 to 100 μm. For example, the thickness of the light absorption layer may be in a range of 1 to 10 μm, 3 to 20 μm, or 5 to 30 μm. By controlling the thickness of the light absorption layer to be within this range, the ΔE* value of the optical filter may be effectively controlled within the range.

According to still another exemplary embodiment, the optical filter may satisfy the following Mathematical Formula 3.

$$W2-W1 \leq 20 \text{ nm} \quad \text{[Mathematical Formula 3]}$$

In Mathematical Formula 3, W1 represents a wavelength at which the near-infrared reflection layer has a transmittance value of 50% for light incident on the optical filter in the vertical direction in a wavelength range of 600 to 800 nm, and W2 represents maximum-absorption wavelength of the light absorption layer.

Specifically, referring to Mathematical Formula 3, a difference between a wavelength W1 at which the near-infrared reflection layer has a transmittance value of 50% to light incident on the optical filter in a vertical direction in wavelength range of 600 to 800 nm and a wavelength at which the light absorption layer has an absorption maximum, that is, a wavelength W2 at which the light absorption layer has the lowest transmittance may be less than or equal to 20 nm. For example, the W2-W1 value may be in a range of 0 nm to 20 nm, 5 nm to 15 nm, or 10 nm to 13 nm. When the W2-W1 value falls within this range, a shift in a transmission spectrum according to a change in angle of incidence may not be prevented, and a superior near-infrared blocking effect may be expected. Also, since the near-infrared reflection layer reflects some of light incident on the light absorption layer, problems which may be caused when the light absorption layer may absorb an excessive amount of light, for example, a decline in efficiency of the optical filter or degradation of the optical filter, may be prevented.

According to still another exemplary embodiment, the optical filter may satisfy the following Mathematical Formula 4.

$$0 \text{ nm} \leq W1-(W2-W3/2) \leq 65 \text{ nm} \quad \text{[Mathematical Formula 4]}$$

In Mathematical Formula 4, W1 represents a wavelength at which the near-infrared reflection layer has a transmittance value of 50% for the light incident on the optical filter in the vertical direction in a wavelength range of 600 to 800 nm, W2 represents a maximum-absorption wavelength of the light absorption layer, and W3 represents an absolute value of a difference between two wavelengths at which the light absorption layer has a transmittance value of 50% for a wavelength that is 600 nm or longer.

Specifically, Mathematical Formula 4 may show the relationships among a wavelength W1 at which the near-infrared reflection layer has a light transmittance of 50% of the light incident on the optical filter in a vertical direction in a wavelength range of 600 to 800 nm, a wavelength W2 at which the light absorption layer has an absorption maximum, and a full width at half maximum (FWHM) W3 at a wavelength at which the light absorption layer has a transmittance value of 50%. For example, the W1-(W2-W3/2) value may be in a range of 0 nm to 65 nm, 5 nm to 40 nm, or 10 nm to 30 nm. Specifically, when the W1-(W2-W3/2) value is adjusted to be within this range, the transmittance of light in a near-infrared region may be minimized. In this case, when the W1-(W2-W3/2) value is less than 0 nm, a shift in a transmission spectrum of the optical filter due to a change in angle of incidence cannot be prevented and the transmittance of light in a near-infrared region may increase such that a problem occurs where users can recognize a distortion of colors present in an image represented on a display device.

On the other hand, when the W1-(W2-W3/2) value is greater than 65 nm, stability of the formulation of the light absorption layer may be degraded, and the transmittance of light in the visible region contributing to generation of images may instead be decreased, thus resulting in distorted images. When Mathematical Formula 1 and Mathematical Formulas 2 to 4 are satisfied at the same time, an angle of incidence of light incident on the optical filter may be changed, but distortion of an image caused accordingly may be minimized, thus it is possible to reproduce colors at the same accuracy as in an image observed with the naked eye. In this case, the optical filter may be more effectively realized when the wavelength at which the light absorption layer has an absorption maximum is controlled to be in a range of 670 to 720 nm, and the wavelength at which the near-infrared reflection layer has a light transmittance of 50% is controlled to be in a range of 690 to 720 nm, as guided by Mathematical Formulas 1 to 4.

In an optical filter with such a structure, unnecessary transmission peaks may be generated in a wavelength range of the near-infrared region (700 to 750 nm), depending on the absorption characteristics of the light absorption layer.

According to yet another exemplary embodiment, the optical filter according to one exemplary embodiment of the present invention may satisfy the following Mathematical Formula 5 to prevent the generation of the unnecessary transmission peaks.

$$\% \text{ } T_{NIR\text{-}peak} \leq 10\% \quad \text{[Mathematical Formula 5]}$$

In Mathematical Formula 5, % $T_{NIR\text{-}peak}$ represents a maximum transmittance in a wavelength range of 700 to 750 nm.

Specifically, the % $T_{NIR\text{-}peak}$ represents a maximum transmittance in the wavelength range of the near-infrared region. Here, the % $T_{NIR\text{-}peak}$ may be less than or equal to 10%. For example, the % $T_{NIR\text{-}peak}$ may be in a range of 0.1% to 8%, 1% to 5%, or 1% to 2% and preferably 0%. Distortion of an image may be reduced as the % $T_{NIR\text{-}peak}$ reaches 0%.

As a high-pixel-density imaging device using a sensor having a high sensitivity such as the BSI-type CMOS sensor is developed, when an angle of incidence of light incident on the optical filter applied to the imaging device varies, a shift in a transmission spectrum of the optical filter was caused. In this case, images provided by the high-pixel-density imaging device is severely distorted. To prevent such a severe distortion, an alternative to controlling the difference in wavelengths at which the transmittance of light that is incident on the optical filter in the vertical direction and passes through the optical filter and light that is incident at an angle of 30° with respect to the vertical direction of the optical filter and passes through the optical filter is 50% was introduced in the prior art. However, there was a limit to preventing the distortion of images only by controlling the difference in the wavelengths at which the transmittance of light incident in each of the angles is 50%. That is, the transmittance of the optical filter drastically varies at a wavelength at which the transmittance of light incident in each of the angles is 30% when the angle of incidence of the light varies. As a result, the images remained distorted.

To solve the problems of the prior art as described above, in the optical filter according to one exemplary embodiment of the present invention, the wavelength at which the transmittance of light incident at the each of the angles of incidence is 50% and the wavelength at which the transmittance of light incident at each of the angles of incidence is 30% as described in Mathematical Formulas 1 to 5 were controlled at the same time. As a result, when the difference in the wavelengths at which the transmittance of the light that is incident on the optical filter in the vertical direction and passes through the optical filter and the light that is incident at an angle of 30° with respect to the vertical direction of the optical filter and passes through the optical filter is 30% is controlled to 15 nm or less, the optical filter according to one exemplary embodiment of the present invention was able to further reduce distortion of images compared to the conventional optical filters.

Hereinafter, a configuration of the optical filter according to one exemplary embodiment of the present invention will be described in further detail.

The optical filter according to one exemplary embodiment of the present invention may include a light absorption layer including at least one light absorbing agent and a near-infrared reflection layer. Therefore, most of the light of the near-infrared region incident on the optical filter is reflected by the near-infrared reflection layer.

According to another exemplary embodiment, the optical filter may further include a transparent base formed on one surface of the light absorption layer. For example, the transparent base may be a transparent glass substrate or a transparent resin-based substrate.

Specifically, a transparent glass substrate may be used as the transparent base, and a phosphate-based glass containing copper oxide (CuO) may be used when necessary. When glass is used as the substrate, thermal deformation may be prevented and bending may be suppressed during manufacturing of the filters without decreasing transmittance of visible light.

The transparent resin-based substrate may have an excellent strength. For example, a light-transmitting resin in which an inorganic filler is dispersed may be used. The type of the light-transmitting resin is not particularly limited, and the binder resins said to be applicable to the light absorption layer may be used. For example, the type of the binder resin used in the light absorption layer and the type of the resin used in the transparent base may be controlled in the same or a similar manner to reduce occurrences of interfacial delamination.

The near-infrared reflection layer may be formed as a dielectric multilayer. The near-infrared reflection layer serves to reflect light of a near-infrared region. For example, a dielectric multilayer in which a high refractive index layer and a low refractive index layer are alternately stacked may be used as the near-infrared reflection layer. When necessary, the near-infrared reflection layer may further include an aluminum deposition film, a noble metal thin film, or a resin film in which fine particles of either indium oxide or tin oxide are dispersed.

By way of an example, the near-infrared reflection layer may have a structure in which a dielectric layer having a first refractive index and a dielectric layer having a second refractive index are alternately stacked. A difference in refractive index between a dielectric layer having a first refractive index and a dielectric layer having a second refractive index may be greater than or equal to 0.2, or 0.3, or in a range of 0.2 to 1.0.

For example, the dielectric layer having a first refractive index may be a layer having a relatively high refractive index, and the dielectric layer having a second refractive index may be a layer having a relatively low refractive index. In this case, the refractive index of the dielectric layer having a first refractive index may be in a range of 1.6 to 2.4, and the refractive index of the dielectric layer having a second refractive index may be in a range of 1.3 to 1.6.

The dielectric layer having a first refractive index may be formed of at least one selected from the group consisting of titanium oxide, alumina, zirconium oxide, tantalum pentoxide, niobium pentoxide, lanthanum oxide, yttrium oxide, zinc oxide, zinc sulfide, and indium oxide. The indium oxide may further include a small amount of titanium oxide, tin oxide, or cerium oxide when necessary.

The dielectric layer having a second refractive index may be formed of at least one selected from the group consisting of silica, lanthanum fluoride, magnesium fluoride, and sodium fluoride alumina.

The method of forming the near-infrared reflection layer is not particularly limited, and the near-infrared reflection layer may, for example, be formed using a method such as CVD, sputtering, vacuum evaporation, etc.

The near-infrared reflection layer may have a structure in which the dielectric layer having a first refractive index and the dielectric layer having a second refractive index are alternately stacked 5 to 61 times, 11 to 51 times, or 21 to 41 times. The near-infrared reflection layer may be designed in consideration of a desired range of transmittance and refractive index, a region of wavelengths to be blocked, etc.

The near-infrared reflection layer may further include a light absorbing agent dispersed in the dielectric multilayer. For example, the light absorbing agent dispersed in the dielectric multilayer may be used without any particular limitation as long as the light absorbing agent can absorb in a near-infrared (>500 nm) to infrared wavelength region. The light absorbing agent may be dispersed in the dielectric multilayer to reduce the number of stacked alternating layers in the dielectric multilayer, thereby reducing thickness of the near-infrared reflection layer. In this way, when the near-infrared reflection layer is applied to the imaging device, the imaging device may be made smaller.

According to one exemplary embodiment, when the dielectric multilayer further includes the light absorbing agent, the dielectric multilayer may be manufactured to a smaller thickness, thereby making the device smaller.

The present invention may provide an imaging device including the optical filter according to one exemplary embodiment of the present invention. The optical filter according to one exemplary embodiment of the present invention is also applicable to display devices including a PDP, etc. However, the optical filter is more preferably applicable to recent imaging devices requiring high pixel density, for example, cameras with over eight million pixels, etc. For example, the optical filter according to one exemplary embodiment of the present invention is effectively applicable to cameras of mobile devices.

EXAMPLES

Hereinafter, the optical filter having a novel structure according to one exemplary embodiment of the present invention will be described in greater detail with reference to specific embodiments of the present invention. However, it should be understood that the description proposed herein is just a preferred example for the purpose of illustration only and is not intended to limit or define the scope of the invention.

Preparative Example 1

$TiO_2$ and $SiO_2$ were alternately deposited on one surface of a glass base using an E-beam evaporator to form a near-infrared reflection layer having a thickness of 4.210 μm.

Separately, a light absorbing agent which was commercially available and had an absorption maximum of 670 nm, a cyclic olefin-based resin as a binder resin source, and toluene (commercially available from Sigma Aldrich) were mixed and then stirred for at least a day using a magnetic stirrer to prepare a solution for near-infrared absorption.

Next, the prepared solution for near-infrared absorption was spin-coated on the surface of the glass substrate opposite to the surface on which near-infrared reflection layer was formed to form a light absorption layer.

The optical filter according to one exemplary embodiment of the present invention was manufactured using the above-described method. A stacked structure of the manufactured optical filter is shown in FIG. 1. Referring to FIG. 1, a near-infrared reflection layer 20 is formed on a bottom surface of a glass substrate 10, and a light absorption layer 30 is formed on a top surface of the glass substrate 10.

Figure 2:
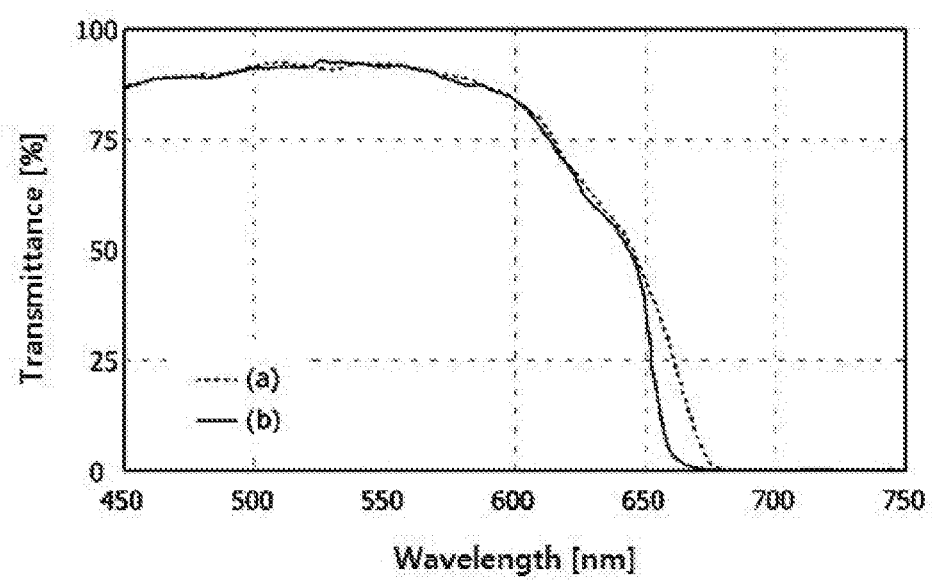
FIGS. 2, 3, 4, 5 and 6 are graphs illustrating the light transmittance spectra of the optical filter according to one exemplary embodiment of the present invention.

A light transmittance test was carried out on the optical filter manufactured in this Preparative Example 1 at different angles of incidence of light of (a) 0° and (b) 30°. The results are shown in FIG. 2.

Preparative Example 2

Figure 3:
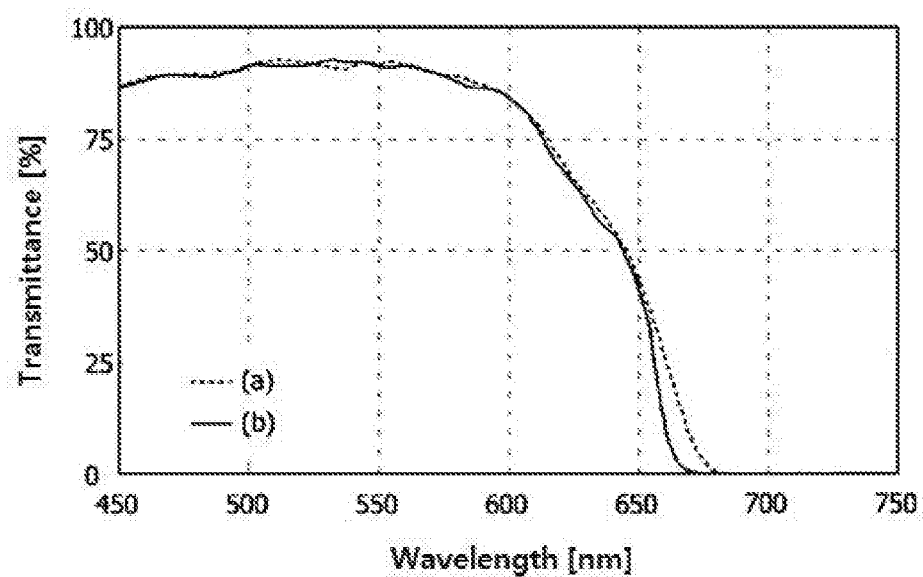

An optical filter was manufactured in the same manner as in Preparative Example 1, except that the thickness of the near-infrared reflection layer was varied to 4.238 μm. Also, an experiment for measuring the light transmittance was carried out on the optical filter manufactured in this Preparative Example 2 at different angles of incidence of light of (a) 0° and (b) 30°. The results are shown in FIG. 3.

Preparative Example 3

Figure 4:
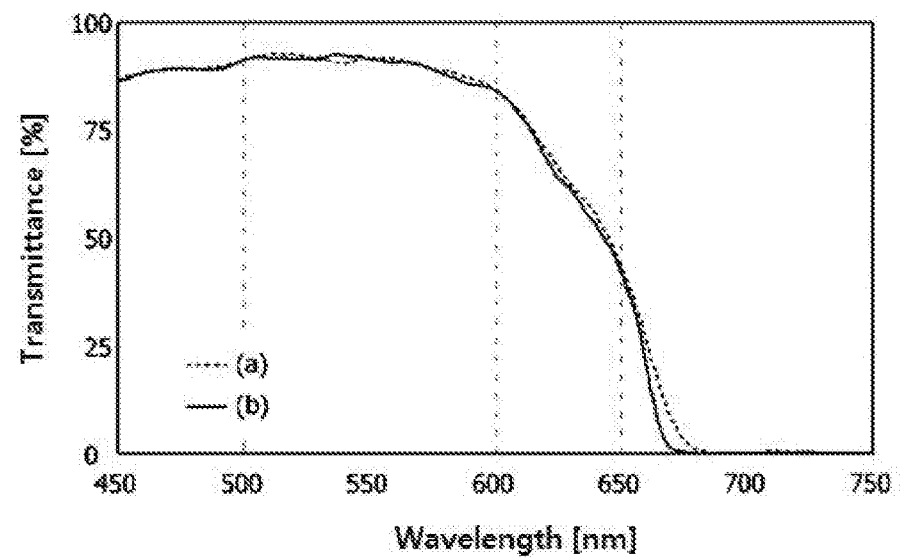

An optical filter was manufactured in the same manner as in Preparative Example 1, except that the thickness of the near-infrared reflection layer was varied to 4.269 μm. Also, an experiment for measuring the light transmittance was carried out on the optical filter manufactured in this Preparative Example 3 at different angles of incidence of light of (a) 0° and (b) 30°. The results are shown in FIG. 4.

Preparative Example 4

Figure 5:
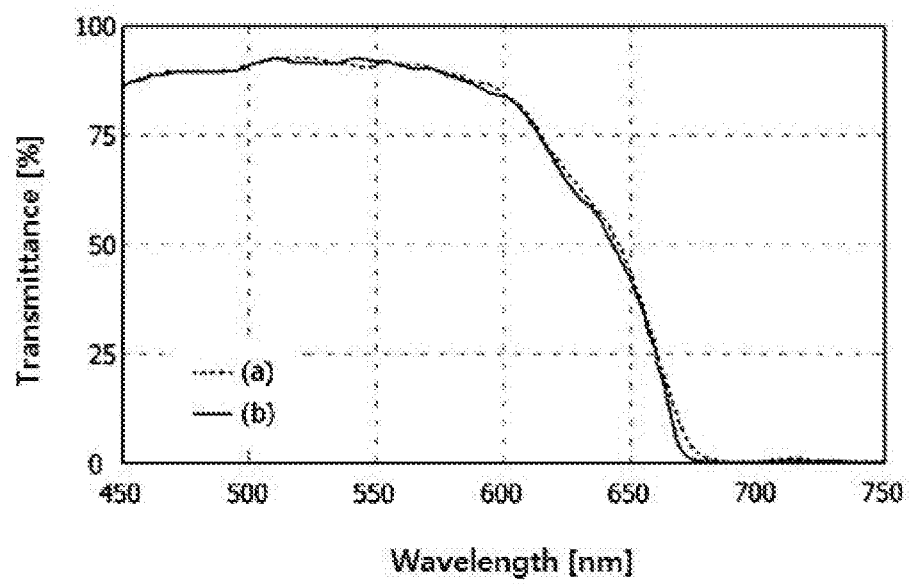

An optical filter was manufactured in the same manner as in Preparative Example 1, except that the thickness of the near-infrared reflection layer was varied to 4.299 μm. Also, an experiment for measuring the light transmittance was carried out on the optical filter manufactured in this Preparative Example 4 at different angles of incidence of light of (a) 0° and (b) 30°. The results are shown in FIG. 5.

Preparative Example 5

Figure 6:
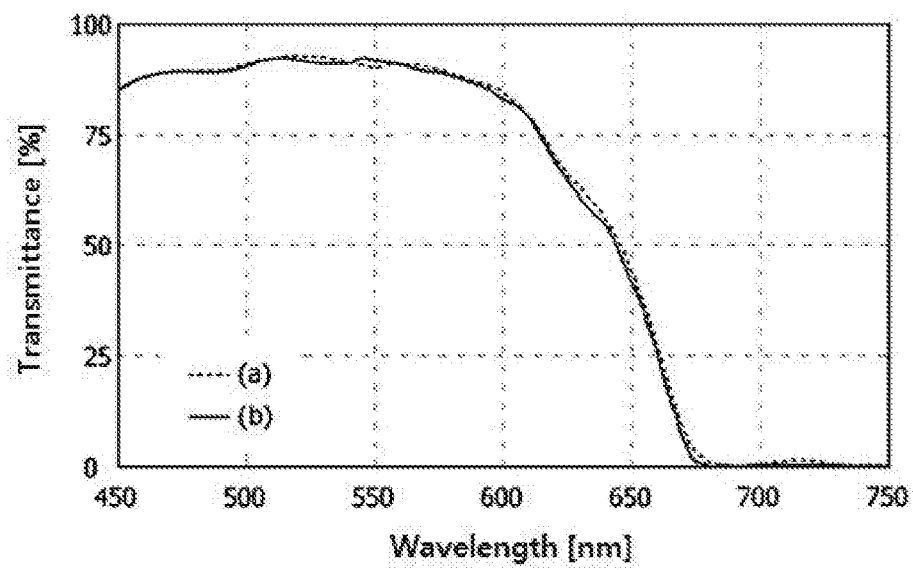

An optical filter was manufactured in the same manner as in Preparative Example 1, except that the thickness of the near-infrared reflection layer was varied to 4.331 μm. Also, an experiment for measuring the light transmittance was carried out on the optical filter manufactured in this Preparative Example 5 at different angles of incidence of light of (a) 0° and (b) 30°. The results are shown in FIG. 6.

Preparative Example 6

An optical filter was manufactured in the same manner as in Preparative Example 1, except that a light absorbing agent that was commercially available and had a maximum-absorption wavelength of 700 nm was used instead.

Comparative Example 1

Figure 7:
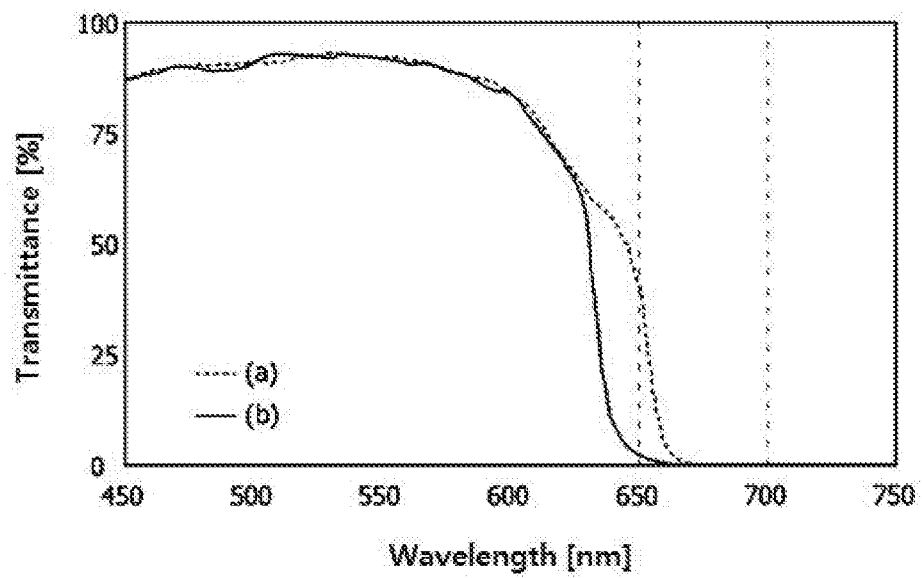
FIGS. 7 and 8 are graphs illustrating the light transmittance spectra of optical filters according to Comparative Examples, respectively.

An optical filter was manufactured in the same manner as in Preparative Example 1, except that the thickness of the near-infrared reflection layer was varied to 4.073 μm. Also, an experiment for measuring the light transmittance was carried out on the optical filter manufactured in this Comparative Example 1 at different angles of incidence of light of (a) 0° and (b) 30°. The results are shown in FIG. 7.

Comparative Example 2

Figure 8:
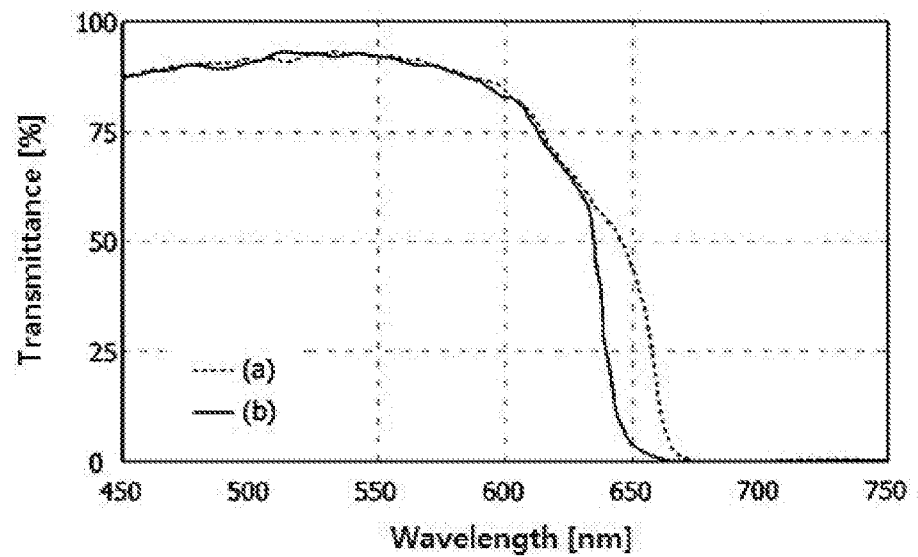

An optical filter was manufactured in the same manner as in Preparative Example 1, except that the thickness of the near-infrared reflection layer was varied to 4.110 μm. Also, an experiment for measuring the light transmittance was carried out on the optical filter manufactured in this Comparative Example 2 at different angles of incidence of light of (a) 0° and (b) 30°. The results are shown in FIG. 8.

Experimental Example 1

The optical filters manufactured in Preparative Examples 1 to 5 and Comparative Examples 1 to 2 were measured for an absolute value ($\Delta T_{30\%}$) of a difference between a wavelength at which the transmittance of light incident on the optical filter in a vertical direction in a wavelength region of 600 to 750 nm was 30% and a wavelength at which the transmittance of light incident at an angle of 30° with respect to the vertical direction of the optical filter was 30%.

The results are listed in the following Table 1.

TABLE 1

| No. | $\Delta T_{30\%}$ (nm) |
|---|---|
| Preparative Example 1 | 6.6 |
| Preparative Example 2 | 3.0 |
| Preparative Example 3 | 1.2 |
| Preparative Example 4 | 1.0 |
| Preparative Example 5 | 0.9 |
| Comparative Example 1 | 18.7 |
| Comparative Example 2 | 17.2 |

As listed in Table 1, it could be seen that the absolute value ($\Delta T_{30\%}$) of the difference between the wavelength at which the transmittance of light incident on the optical filter in a vertical direction in a wavelength region of 600 to 750 nm was 30%, and the wavelength at which the transmittance of light incident at an angle of 30° with respect to the vertical direction of the optical filter was 30% was less than or equal to 15 nm in the case of the optical filters according to the embodiments of the present invention.

Experimental Example 2

Figure 9:
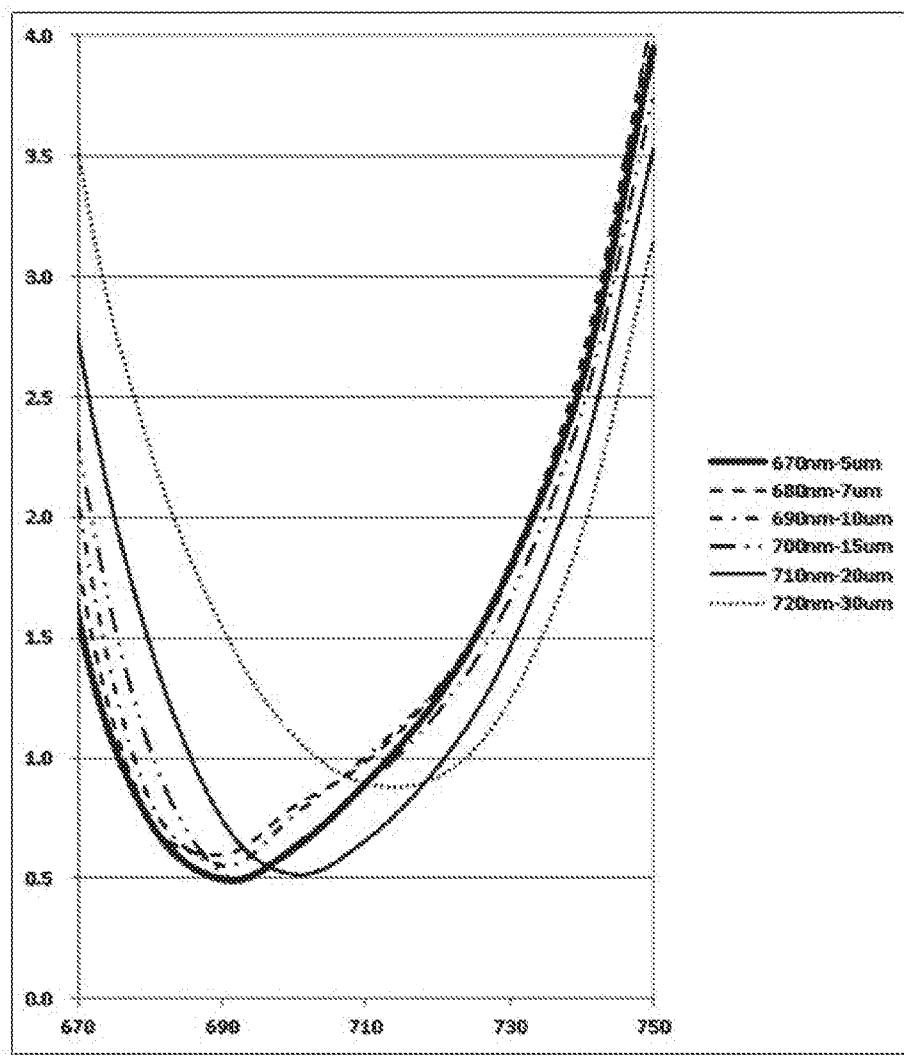
FIG. 9 is a graph illustrating $\Delta E^*$ values versus the maximum-absorption wavelength ($\lambda$) of a light absorption layer and the thickness of a light absorption layer of the optical filter according to one exemplary embodiment of the present invention.

Optical filters were manufactured in the same manner as in Preparative Example 1, except that the maximum-absorption wavelength (λ) of the light absorption layer and the thickness of the light absorption layer were varied as listed in the following Table 2. Also, the ΔE* value of each of the optical filters was measured. The results are listed the following Table 2 and shown in FIG. 9. In FIG. 9, the horizontal axis represents a wavelength W1 at which the near-infrared reflection layer had a transmittance value of 50%, and the vertical axis represents ΔE*. The curves in the graph shown in FIG. 9 are plotted for ΔE* for varying the wavelength W1 at which the near-infrared reflection layer had a transmittance value of 50% when the light absorption layer had a predetermined maximum-absorption wavelength (λ) and thickness.

Specifically, the color coordinates L*, a* and b* of the light passing through each of the optical filters when white light was irradiated on the manufactured optical filter in a vertical direction (an angle of incidence of 0°) and irradiated at an angle of 30° with respect to the vertical direction of the optical filter were measured using a Lambda 35 spectrophotometer commercially available from Perkin Elmer, and the ΔE* values were then calculated.

In this case, the wavelength W1 at which the near-infrared reflection layer had a transmittance value of 50% was controlled to be in a range of 650 nm to 750 nm by varying the number of stacked layers of alternating $TiO_2$ and $SiO_2$ used to form the near-infrared reflection layer.

reflection layer was varied when the light absorption layer had a predetermined maximum-absorption wavelength (λ) (nm) and thickness. In this case, it could be seen that the ΔE* values were less than or equal to 1.5 in the optical filter according to one exemplary embodiment of the present invention when the maximum-absorption wavelength of the light absorption layer was in a range of 670 to 720 nm, and the wavelength W1 at which the near-infrared reflection layer had a transmittance value of 50% was in a range of 690 to 720 nm. As a result, it could be seen that the color difference was narrowed to an extent of being unrecognizable with the naked eye even when the angle of incidence was varied from 0° to 30°.

On the other hand, it could be seen that the ΔE* values were controlled to 0.8 or less when the maximum-absorption wavelength of the light absorption layer was in a range of 670 to 710 nm and the maximum-absorption wavelength W1 of the light absorption layer was in a range of 690 to 710 nm, thereby making it substantially impossible to recognize the color difference with the naked eye. It was revealed that, when the ΔE* values were less than or equal to 0.8, for example, in a range of 0.478 to 0.572, the $t_{abs}$ values (a thickness of a light absorbing agent layer when the light absorbing agent layer is formed to have the same area as the light absorption layer using the same amount of the light

TABLE 2

| λ (nm) | Thickness (μm) | W1 (nm) | | | | | | | | | | |
|---|---|---|---|---|---|---|---|---|---|---|---|---|
| | | 650 | 660 | 670 | 680 | 690 | 700 | 710 | 720 | 730 | 740 | 750 |
| 670 | 4 | 7.5 | 4.1 | 1.7 | 0.8 | 0.5 | 0.6 | 0.9 | 1.3 | 1.8 | 2.7 | 4.2 |
| 670 | 5 | 7.1 | 3.8 | 1.6 | 0.8 | 0.5 | 0.6 | 0.9 | 1.3 | 1.8 | 2.7 | 4.1 |
| 680 | 6 | 7.8 | 4.4 | 1.9 | 0.8 | 0.6 | 0.8 | 1.0 | 1.3 | 1.8 | 2.7 | 4.1 |
| 680 | 7 | 7.5 | 4.2 | 1.8 | 0.8 | 0.6 | 0.8 | 1.0 | 1.3 | 1.8 | 2.7 | 4.1 |
| 680 | 8 | 7.2 | 4.0 | 1.7 | 0.8 | 0.6 | 0.7 | 1.0 | 1.3 | 1.8 | 2.7 | 4.1 |
| 680 | 9 | 6.9 | 3.8 | 1.7 | 0.8 | 0.6 | 0.7 | 0.9 | 1.3 | 1.7 | 2.7 | 4.1 |
| 690 | 10 | 7.5 | 4.4 | 2.1 | 0.8 | 0.6 | 0.8 | 1.0 | 1.3 | 1.7 | 2.6 | 4.0 |
| 690 | 11 | 7.3 | 4.3 | 2.0 | 0.8 | 0.6 | 0.7 | 1.0 | 1.3 | 1.7 | 2.6 | 4.0 |
| 690 | 12 | 7.1 | 4.2 | 1.9 | 0.8 | 0.6 | 0.7 | 1.0 | 1.3 | 1.7 | 2.6 | 3.9 |
| 690 | 13 | 7.0 | 4.1 | 1.9 | 0.8 | 0.6 | 0.7 | 1.0 | 1.3 | 1.7 | 2.6 | 3.9 |
| 700 | 15 | 7.5 | 4.5 | 2.3 | 1.1 | 0.5 | 0.6 | 0.9 | 1.2 | 1.6 | 2.5 | 3.8 |
| 700 | 16 | 7.4 | 4.4 | 2.3 | 1.1 | 0.5 | 0.6 | 0.9 | 1.2 | 1.6 | 2.5 | 3.7 |
| 700 | 17 | 7.2 | 4.4 | 2.2 | 1.1 | 0.5 | 0.6 | 0.8 | 1.2 | 1.6 | 2.4 | 3.7 |
| 700 | 18 | 7.1 | 4.3 | 2.2 | 1.1 | 0.5 | 0.6 | 0.8 | 1.2 | 1.6 | 2.4 | 3.7 |
| 710 | 19 | 8.2 | 5.0 | 2.8 | 1.5 | 0.7 | 0.5 | 0.7 | 1.0 | 1.5 | 2.3 | 3.6 |
| 710 | 20 | 8.1 | 5.0 | 2.7 | 1.5 | 0.7 | 0.5 | 0.7 | 1.0 | 1.4 | 2.3 | 3.5 |
| 710 | 21 | 8.1 | 4.9 | 2.7 | 1.5 | 0.8 | 0.5 | 0.6 | 1.0 | 1.4 | 2.3 | 3.5 |
| 710 | 22 | 8.0 | 4.9 | 2.7 | 1.5 | 0.8 | 0.5 | 0.6 | 0.9 | 1.4 | 2.2 | 3.5 |
| 710 | 23 | 7.9 | 4.8 | 2.7 | 1.5 | 0.8 | 0.5 | 0.6 | 0.9 | 1.4 | 2.2 | 3.4 |
| 710 | 24 | 7.9 | 4.8 | 2.7 | 1.6 | 0.8 | 0.6 | 0.6 | 0.9 | 1.4 | 2.2 | 3.4 |
| 710 | 25 | 7.8 | 4.8 | 2.7 | 1.6 | 0.9 | 0.6 | 0.6 | 0.9 | 1.4 | 2.2 | 3.4 |
| 720 | 27 | 9.3 | 5.9 | 3.5 | 2.2 | 1.4 | 1.0 | 0.8 | 0.8 | 1.2 | 2.0 | 3.2 |
| 720 | 28 | 9.3 | 5.9 | 3.5 | 2.2 | 1.4 | 1.0 | 0.8 | 0.9 | 1.2 | 2.0 | 3.2 |
| 720 | 29 | 9.3 | 5.9 | 3.5 | 2.3 | 1.5 | 1.0 | 0.9 | 0.9 | 1.2 | 2.0 | 3.2 |
| 720 | 30 | 9.2 | 5.9 | 3.5 | 2.3 | 1.5 | 1.1 | 0.9 | 0.9 | 1.2 | 2.0 | 3.2 |
| 720 | 31 | 9.2 | 5.9 | 3.5 | 2.3 | 1.6 | 1.1 | 0.9 | 1.0 | 1.2 | 2.0 | 3.1 |
| 720 | 32 | 9.2 | 5.9 | 3.6 | 2.4 | 1.6 | 1.2 | 1.0 | 1.0 | 1.3 | 2.0 | 3.1 |
| 720 | 33 | 9.2 | 5.9 | 3.6 | 2.4 | 1.7 | 1.2 | 1.0 | 1.0 | 1.3 | 2.0 | 3.1 |
| 720 | 34 | 9.2 | 5.9 | 3.6 | 2.5 | 1.7 | 1.3 | 1.1 | 1.1 | 1.3 | 2.0 | 3.1 |
| 720 | 35 | 9.2 | 5.9 | 3.6 | 2.5 | 1.7 | 1.3 | 1.1 | 1.1 | 1.3 | 2.0 | 3.1 |
| 720 | 36 | 9.2 | 5.9 | 3.6 | 2.5 | 1.8 | 1.4 | 1.2 | 1.2 | 1.4 | 2.0 | 3.1 |
| 720 | 37 | 9.2 | 5.9 | 3.7 | 2.6 | 1.8 | 1.4 | 1.2 | 1.2 | 1.4 | 2.0 | 3.1 |
| 720 | 38 | 9.2 | 5.9 | 3.7 | 2.6 | 1.9 | 1.5 | 1.3 | 1.2 | 1.4 | 2.0 | 3.0 |
| 720 | 39 | 9.1 | 5.9 | 3.7 | 2.6 | 1.9 | 1.5 | 1.3 | 1.3 | 1.5 | 2.0 | 3.0 |
| 720 | 40 | 9.1 | 5.9 | 3.7 | 2.7 | 2.0 | 1.6 | 1.4 | 1.3 | 1.5 | 2.0 | 3.0 |
| 720 | 41 | 9.1 | 5.9 | 3.8 | 2.7 | 2.0 | 1.6 | 1.4 | 1.4 | 1.5 | 2.0 | 3.0 |
| 720 | 42 | 9.1 | 5.9 | 3.8 | 2.7 | 2.1 | 1.7 | 1.5 | 1.4 | 1.6 | 2.0 | 3.0 |
| 720 | 43 | 9.1 | 5.9 | 3.8 | 2.8 | 2.1 | 1.7 | 1.5 | 1.5 | 1.6 | 2.1 | 3.0 |

Table 2 and FIG. 9 show the ΔE* values when the maximum-absorption wavelength W1 of the near-infrared absorbing agent as the light absorbing agent included in the light absorption layer) were as listed in Table 3.

TABLE 3

| ΔE* | $t_{abs}$ (μm) |
|---|---|
| 0.478 | 0.020 |
| 0.493 | 0.025 |
| 0.567 | 0.030 |
| 0.573 | 0.035 |
| 0.575 | 0.040 |
| 0.573 | 0.045 |
| 0.550 | 0.050 |
| 0.551 | 0.055 |
| 0.551 | 0.060 |
| 0.551 | 0.065 |
| 0.502 | 0.075 |
| 0.505 | 0.080 |
| 0.508 | 0.085 |
| 0.511 | 0.090 |
| 0.511 | 0.095 |
| 0.517 | 0.100 |
| 0.525 | 0.105 |
| 0.534 | 0.110 |
| 0.545 | 0.115 |
| 0.558 | 0.120 |
| 0.572 | 0.125 |

Experimental Example 3

The optical filters manufactured in Preparative Examples 1 and 6 were measured for an absolute value ($\Delta T_{30\%}$) of a difference between a wavelength at which the transmittance of light incident on the optical filter in the vertical direction was 30%, and a wavelength at which the transmittance of light incident at an angle of 30° with respect to the vertical direction of the optical filter was 30%.

Also, W1, W2 and W3 were measured to calculate a W2-W1 value shown in Mathematical Formula 2 and a W1-(W2-W3/2) value shown in Mathematical Formula 3.

In this case, the wavelength W1 at which the near-infrared reflection layer had a transmittance value of 50% was controlled to be in a range of 650 nm to 750 nm by varying the number of stacked layers of alternating $TiO_2$ and $SiO_2$ used to form the near-infrared reflection layer.

Also, the optical filters were measured after the light absorption layer was formed to have different thicknesses of 7, 11 and 15 μm. The results are listed in the following Tables 4 to 6.

(3-1) Formation of Light Absorption Layer Having a Thickness of 7 μm (W3=57 nm)

TABLE 4

| | Preparative Example 1 | | | Preparative Example 6 | | |
|---|---|---|---|---|---|---|
| W1 (nm) | $\Delta T_{30\%}$ (nm) | W2 − W1 (nm) | W1 − (W2 − W3/2) (nm) | $\Delta T_{30\%}$ (nm) | W2 − W1 (nm) | W1 − (W2 − W3/2) (nm) |
| 650 | 19 | 30 | −2 | 21 | 50 | −22 |
| 660 | 17 | 21 | 8 | 21 | 41 | −12 |
| 670 | 10 | 10 | 19 | 20 | 30 | −1 |
| 680 | 4 | 0 | 28 | 17 | 20 | 8 |
| 690 | 1 | −10 | 39 | 11 | 10 | 19 |
| 700 | 1 | −20 | 49 | 4 | 0 | 29 |
| 710 | 1 | −30 | 58 | 1 | −10 | 38 |
| 720 | 1 | −40 | 69 | 1 | −20 | 49 |
| 730 | 1 | −50 | 78 | 1 | −30 | 58 |
| 740 | 1 | −60 | 89 | 1 | −40 | 69 |
| 750 | 1 | −70 | 98 | 1 | −50 | 78 |

Referring to Table 4, it was revealed that the optical filter of Preparative Example 1 had a $\Delta T_{30\%}$ value of 10 nm or less when the wavelength at which the near-infrared reflection layer had a transmittance value of 50% was in a range of 670 to 750 nm, and the optical filter of Preparative Example 6 had a $\Delta T_{30\%}$ value of 10 nm or less when the wavelength at which the near-infrared reflection layer had a transmittance value of 50% was in a range of 690 to 750 nm. Also, it was revealed that the optical filter of Preparative Example 1 had a W2-W1 value of 20 nm or less when the wavelength at which the near-infrared reflection layer had a transmittance value of 50% was in a range of 670 to 750 nm, and the optical filter of Preparative Example 6 had a W2-W1 value of 20 nm or less when the wavelength at which the near-infrared reflection layer had a transmittance value of 50% was in a range of 680 to 750 nm. Also, it was revealed that the optical filter of Preparative Example 1 had a W1−(W2−W3/2) value of 20 to 65 nm when the wavelength at which the near-infrared reflection layer had a transmittance value of 50% was in a range of 680 to 710 nm, and the optical filter of Preparative Example 6 had a W1−(W2−W3/2) value of 20 to 65 nm when the wavelength at which the near-infrared reflection layer had a transmittance value of 50% was in a range of 700 to 730 nm.

(3-2) Formation of Light Absorption Layer Having a Thickness of 11 μm (W3=71 nm)

TABLE 5

| | Preparative Example 1 | | | Preparative Example 6 | | |
|---|---|---|---|---|---|---|
| W1 (nm) | $\Delta T_{30\%}$ (nm) | W2 − W1 (nm) | W1 − (W2 − W3/2) (nm) | $\Delta T_{30\%}$ (nm) | W2 − W1 (nm) | W1 − (W2 − W3/2) (nm) |
| 650 | 18 | 30 | 5 | 20 | 50 | −15 |
| 660 | 13 | 21 | 15 | 18 | 41 | −5 |
| 670 | 6 | 10 | 25 | 14 | 30 | 5 |
| 680 | 1 | 0 | 35 | 6 | 20 | 15 |
| 690 | 1 | −10 | 46 | 2 | 10 | 26 |
| 700 | 1 | −20 | 55 | 1 | 0 | 35 |
| 710 | 1 | −30 | 65 | 1 | −10 | 45 |
| 720 | 1 | −40 | 76 | 1 | −20 | 56 |
| 730 | 1 | −50 | 85 | 1 | −30 | 65 |
| 740 | 1 | −60 | 96 | 1 | −40 | 76 |
| 750 | 1 | −70 | 105 | 1 | −50 | 85 |

Referring to Table 5, it was revealed that the optical filter of Preparative Example 1 had a $\Delta T_{30\%}$ value of 10 nm or less when the wavelength at which the near-infrared reflection layer had a transmittance value of 50% was in a range of 660 to 750 nm, and the optical filter of Preparative Example 6 had a $\Delta T_{30\%}$ value of 10 nm or less when the wavelength at which the near-infrared reflection layer had a transmittance value of 50% was in a range of 680 to 750 nm. Also, it was revealed that the optical filter of Preparative Example 1 had a W1−(W2−W3/2) value of 20 nm to 65 nm when the wavelength at which the near-infrared reflection layer had a transmittance value of 50% was in a range of 670 to 710 nm, and the optical filter of Preparative Example 6 had a W1−(W2−W3/2) value of 20 to 65 nm when the wavelength at which the near-infrared reflection layer had a transmittance value of 50% was in a range of 690 to 730 nm.

(3-3) Formation of Light Absorption Layer Having a Thickness of 15 μm (W3=83 nm)

TABLE 6

| | Preparative Example 1 | | | Preparative Example 6 | | |
|---|---|---|---|---|---|---|
| W1 (nm) | $\Delta T_{30\%}$ (nm) | W2 − W1 (nm) | W1 − (W2 − W3/2) (nm) | $\Delta T_{30\%}$ (nm) | W2 − W1 (nm) | W1 − (W2 − W3/2) (nm) |
| 650 | 16 | 30 | 12 | 20 | 50 | −8 |
| 660 | 9 | 21 | 21 | 20 | 41 | 1 |
| 670 | 3 | 10 | 32 | 16 | 30 | 12 |
| 680 | 1 | 0 | 41 | 10 | 20 | 21 |
| 690 | 1 | −10 | 52 | 3 | 10 | 32 |
| 700 | 1 | −20 | 62 | 1 | 0 | 42 |
| 710 | 1 | −30 | 71 | 1 | −10 | 51 |
| 720 | 1 | −40 | 82 | 1 | −20 | 62 |
| 730 | 1 | −50 | 91 | 1 | −30 | 71 |
| 740 | 1 | −60 | 102 | 1 | −40 | 82 |
| 750 | 1 | −70 | 112 | 1 | −50 | 92 |

Referring to Table 6, it was revealed that the optical filter of Preparative Example 1 had a $\Delta T_{30\%}$ value of 10 nm or less and a W1−(W2−W3/2) value of 20 nm to 65 nm when the wavelength at which the near-infrared reflection layer had a transmittance value of 50% was in a range of 660 to 700 nm, and the optical filter of Preparative Example 6 had a $\Delta T_{30\%}$ value of 10 nm or less and a W1−(W2−W3/2) value of 20 nm to 65 nm when the wavelength at which the near-infrared reflection layer had a transmittance value of 50% was in a range of 680 to 720 nm.

Experimental Example 4

The optical filters manufactured in Preparative Examples 1 and 6 were measured for a % $T_{NIR\text{-}peak}$ value and an absolute value ($\Delta T_{30\%}$) of a difference between a wavelength at which the transmittance of light incident on the optical filter in the vertical direction was 30% and a wavelength at which the transmittance of light incident at an angle of 30° with respect to the vertical direction of the optical filter was 30%.

In this case, the wavelength W1 at which the near-infrared reflection layer had a transmittance value of 50% was controlled to be in a range of 650 nm to 750 nm by varying the number of stacked layers of alternating $TiO_2$ and $SiO_2$ used to form the near-infrared reflection layer.

Also, the optical filters were measured after the light absorption layer was formed to have different thicknesses of 7, 11 and 15 μm. The results are listed in the following Tables 7 to 9.

(4-1) Formation of Light Absorption Layer Having a Thickness of 7 μm (W3=57 nm)

TABLE 7

| W1 | Preparative Example 1 | | Preparative Example 6 | |
|---|---|---|---|---|
| (nm) | $\Delta T_{30\%}$ (nm) | % $T_{NIR\text{-}peak}$ (%) | $\Delta T_{30\%}$ (nm) | % $T_{NIR\text{-}peak}$ (%) |
| 650 | 19 | 1 | 21 | 0 |
| 660 | 17 | 1 | 21 | 0 |
| 670 | 10 | 1 | 20 | 1 |
| 680 | 4 | 1 | 17 | 0 |
| 690 | 1 | 5 | 11 | 1 |
| 700 | 1 | 21 | 4 | 2 |
| 710 | 1 | 50 | 1 | 5 |

TABLE 7-continued

| W1 | Preparative Example 1 | | Preparative Example 6 | |
|---|---|---|---|---|
| (nm) | $\Delta T_{30\%}$ (nm) | % $T_{NIR\text{-}peak}$ (%) | $\Delta T_{30\%}$ (nm) | % $T_{NIR\text{-}peak}$ (%) |
| 720 | 1 | 76 | 1 | 21 |
| 730 | 1 | 87 | 1 | 49 |
| 740 | 1 | 92 | 1 | 76 |
| 750 | 1 | 95 | 1 | 87 |

Referring to Table 7, it was revealed that the optical filter of Preparative Example 1 had a $\Delta T_{30\%}$ value of 10 nm or less when the wavelength at which the near-infrared reflection layer had a transmittance value of 50% was in a range of 670 to 750 nm, and the optical filter of Preparative Example 6 had a $\Delta T_{30\%}$ value of 10 nm or less when the wavelength at which the near-infrared reflection layer had a transmittance value of 50% was in a range of 700 to 750 nm. Also, it was revealed that the optical filter of Preparative Example 1 had a % $T_{NIR\text{-}peak}$ value of 10% or less when the wavelength at which the near-infrared reflection layer had a transmittance value of 50% was in a range of 650 to 690 nm, and the optical filter of Preparative Example 6 had a % $T_{NIR\text{-}peak}$ value of 10% or less when the wavelength at which the near-infrared reflection layer had a transmittance value of 50% was in a range of 650 to 710 nm.

Also, it was revealed that the optical filter of Preparative Example 1 had a $\Delta T_{30\%}$ value of 10 nm or less and a % $T_{NIR\text{-}peak}$ value of 10% or less when the wavelength at which the near-infrared reflection layer had a transmittance value of 50% was in a range of 670 to 690 nm, and the optical filter of Preparative Example 6 had a $\Delta T_{30\%}$ value of 10 nm or less and a % $T_{NIR\text{-}peak}$ value of 10% or less when the wavelength at which the near-infrared reflection layer had a transmittance value of 50% was in a range of 700 to 710 nm.

(4-2) Formation of Light Absorption Layer Having a Thickness of 11 μm (W3=71 nm)

TABLE 8

| W1 | Preparative Example 1 | | Preparative Example 6 | |
|---|---|---|---|---|
| (nm) | $\Delta T_{30\%}$ (nm) | % $T_{NIR\text{-}peak}$ (%) | $\Delta T_{30\%}$ (nm) | % $T_{NIR\text{-}peak}$ (%) |
| 650 | 18 | 1 | 20 | 0 |
| 660 | 13 | 1 | 18 | 0 |
| 670 | 6 | 1 | 14 | 1 |
| 680 | 1 | 2 | 6 | 0 |
| 690 | 1 | 8 | 2 | 1 |
| 700 | 1 | 34 | 1 | 1 |
| 710 | 1 | 68 | 1 | 3 |
| 720 | 1 | 84 | 1 | 13 |
| 730 | 1 | 91 | 1 | 39 |
| 740 | 1 | 93 | 1 | 68 |
| 750 | 1 | 94 | 1 | 84 |

Referring to Table 8, it was revealed that the optical filter of Preparative Example 1 had a $\Delta T_{30\%}$ value of 10 nm or less when the wavelength at which the near-infrared reflection layer had a transmittance value of 50% was in a range of 670 to 750 nm, and the optical filter of Preparative Example 6 had a $\Delta T_{30\%}$ value of 10 nm or less when the wavelength at which the near-infrared reflection layer had a transmittance value of 50% was in a range of 680 to 750 nm. Also, it was revealed that the optical filter of Preparative Example 1 had a % $T_{NIR\text{-}peak}$ value of 10% or less when the wavelength at which the near-infrared reflection layer had a transmittance value of 50% was in a range of 650 to 690 nm, and the optical filter of Preparative Example 6 had a % $T_{NIR\text{-}peak}$ value of 10% or less when the wavelength at which the near-infrared reflection layer had a transmittance value of 50% was in a range of 650 to 710 nm.

Also, it was revealed that the optical filter of Preparative Example 1 had a $\Delta T_{30\%}$ value of 10 nm or less and a % $T_{NIR-peak}$ value of 10% or less when the wavelength at which the near-infrared reflection layer had a transmittance value of 50% was in a range of 670 to 690 nm, and the optical filter of Preparative Example 6 had a $\Delta T_{30\%}$ value of 10 nm or less and a % $T_{NIR-peak}$ value of 10% or less when the wavelength at which the near-infrared reflection layer had a transmittance value of 50% was in a range of 680 to 710 nm.

(4-3) Formation of Light Absorption Layer Having a Thickness of 15 μm (W3=83 nm

TABLE 9

| W1 | Preparative Example 1 | | Preparative Example 6 | |
| --- | --- | --- | --- | --- |
| (nm) | $\Delta T_{30\%}$ (nm) | % $T_{NIR-peak}$ (%) | $\Delta T_{30\%}$ (nm) | % $T_{NIR-peak}$ (%) |
| 650 | 16 | 0 | 20 | 0 |
| 660 | 9 | 1 | 20 | 0 |
| 670 | 3 | 1 | 16 | 1 |
| 680 | 1 | 1 | 10 | 0 |
| 690 | 1 | 2 | 3 | 1 |
| 700 | 1 | 9 | 1 | 1 |
| 710 | 1 | 32 | 1 | 2 |
| 720 | 1 | 63 | 1 | 10 |
| 730 | 1 | 80 | 1 | 32 |
| 740 | 1 | 89 | 1 | 63 |
| 750 | 1 | 93 | 1 | 80 |

Referring to Table 9, it was revealed that the optical filter of Preparative Example 1 had a $\Delta T_{30\%}$ value of 10 nm or less when the wavelength at which the near-infrared reflection layer had a transmittance value of 50% was in a range of 660 to 700 nm, and the optical filter of Preparative Example 6 had a $\Delta T_{30\%}$ value of 10 nm or less when the wavelength at which the near-infrared reflection layer had a transmittance value of 50% was in a range of 680 to 720 nm. Also, it was revealed that the optical filter of Preparative Example 1 had a % $T_{NIR-peak}$ value of 10% or less when the wavelength at which the near-infrared reflection layer had a transmittance value of 50% was in a range of 650 to 700 nm, and the optical filter of Preparative Example 6 had a % $T_{NIR-peak}$ value of 10% or less when the wavelength at which the near-infrared reflection layer had a transmittance value of 50% was in a range of 650 to 720 nm.

Also, it was revealed that the optical filter of Preparative Example 1 had a $\Delta T_{30\%}$ value of 10 nm or less and a % $T_{NIR-peak}$ value of 10% or less when the wavelength at which the near-infrared reflection layer had a transmittance value of 50% was in a range of 660 to 700 nm, and the optical filter of Preparative Example 6 had a $\Delta T_{30\%}$ value of 10 nm or less and a % $T_{NIR-peak}$ value of 10% or less when the wavelength at which the near-infrared reflection layer had a transmittance value of 50% was in a range of 680 to 720 nm.

Experimental Example 6

The optical filters manufactured in Preparative Examples 1 and 6 were measured for a % $T_{NIR-peak}$ value and an absolute value ($\Delta T_{30\%}$) of a difference between a wavelength at which the transmittance of light incident on the optical filter in the vertical direction was 30%, and a wavelength at which the transmittance of light incident at an angle of 30° with respect to the vertical direction of the optical filter was 30%.

Also, the color coordinates L*, a* and b* of the light passing through each of the optical filters when white light was irradiated on the manufactured optical filter in the vertical direction (an angle of incidence of 0°) and radiated at an angle of 30° with respect to the vertical direction were measured using a Lambda 35 spectrophotometer commercially available from Perkin Elmer, and the $\Delta E*$ values were then calculated.

In this case, the wavelength W1 at which the near-infrared reflection layer had a transmittance value of 50% was controlled to be in a range of 650 nm to 750 nm by varying the number of stacked layers of alternating $TiO_2$ and $SiO_2$ used to form the near-infrared reflection layer. Also, the optical filter was measured after the light absorption layer was formed to have a thickness of 15 μm (W3=83 nm). The results are listed in the following Table 10.

TABLE 10

| | Preparative Example 1 | | | Preparative Example 6 | | |
| --- | --- | --- | --- | --- | --- | --- |
| W1 (nm) | $\Delta T_{30\%}$ (nm) | % $T_{NIR-peak}$ (%) | $\Delta E*$ | $\Delta T_{30\%}$ (nm) | % $T_{NIR-peak}$ (%) | $\Delta E*$ |
| 650 | 16 | 0 | 5.6 | 20 | 0 | 7.4 |
| 660 | 9 | 1 | 3.0 | 20 | 0 | 4.5 |
| 670 | 3 | 1 | 1.4 | 16 | 1 | 2.3 |
| 680 | 1 | 1 | 0.8 | 10 | 0 | 1.0 |
| 690 | 1 | 2 | 0.6 | 3 | 1 | 0.5 |
| 700 | 1 | 9 | 0.7 | 1 | 1 | 0.6 |
| 710 | 1 | 32 | 0.9 | 1 | 2 | 0.9 |
| 720 | 1 | 63 | 1.2 | 1 | 10 | 1.2 |
| 730 | 1 | 80 | 1.7 | 1 | 32 | 1.6 |
| 740 | 1 | 89 | 2.4 | 1 | 63 | 2.4 |
| 750 | 1 | 93 | 3.8 | 1 | 80 | 3.6 |

Referring to Table 10, it was revealed that the $\Delta T_{30\%}$ and % $T_{NIR-peak}$ values are the same as those in Experimental Example 5-3. Also, it was revealed that the optical filter of Preparative Example 1 had a $\Delta E*$ value of 1.5 or less when the wavelength at which the near-infrared reflection layer had a transmittance value of 50% was in a range of 670 to 720 nm, and the optical filter of Preparative Example 6 had a $\Delta E*$ value of 1.5 or less when the wavelength at which the near-infrared reflection layer had a transmittance value of 50% was in a range of 680 to 720 nm.

Also, it could be seen that the $\Delta T_{30\%}$, % $T_{NIR-peak}$ and $\Delta E*$ values were within the scope of the present invention when the wavelength at which the near-infrared reflection layer had a transmittance value of 50% was in a range of 670 to 700 nm in the case of the optical filter of Preparative Example 1, and when the wavelength at which the near-infrared reflection layer had a transmittance value of 50% was in a range of 680 to 720 nm in the case of the optical filter of Preparative Example 6.

What is claimed is:
1. A near-infrared blocking filter, comprising:
   a glass substrate having first and second sides located opposite to each other;
   a light absorption layer directly disposed on the first side of the glass substrate wherein the light absorption layer includes a binder resin and a light absorbing agent dispersed in the binder resin, and a content of the light absorbing agent is in a range of 0.001 to 10 parts by weight based on 100 parts by weight of the binder resin, wherein the light absorption layer has thickness of 1 to 30 μm; and wherein incident light irradiated to the near-infrared blocking filter firstly reaches a first side of the light absorption layer that is opposite to the first side of the glass substrate and a near-infrared reflection layer disposed on the second side of the glass substrate and reflecting the incident light in the near-infra-red region, wherein the near-infrared blocking filter satisfies the following Mathematical Formula 1:

$$\Delta E^* \leq 1.5 \quad \text{[Mathematical Formula 1]}$$

wherein $\Delta E^*$ is defined as $\sqrt{(\Delta L^*)^2 + (\Delta a^*)^2 + (\Delta b)^2}$ wherein $\Delta L^*$ is a difference between $L1^*$ and $L2^*$ in color coordinates of two colors E1 and E2, $\Delta a^*$ is a difference between $a1^*$ and $a2^*$ in the color coordinates of the colors E1 and E2, $\Delta L,^*$ is a difference between $b1^*$ and $b2^*$ in the color coordinates of the colors E1 and E2, and the $\Delta E^*$ value represents a color difference specified by a color coordinate space in CIE Lab between light that is incident in a vertical direction of the near-infrared blocking filter and passes through the near-infrared blocking filter and light that is incident at an angle of 30° with respect to the vertical direction of the near-infrared blocking filter and passes through the optical filter, and wherein the color difference is not recognized by human eyesight when the $\Delta E^*$ value is less than or equal to 0.5, and the color difference is clearly recognized by the human eyesight when the $\Delta E^*$ value is greater than or equal to 2.0.

2. The near-infrared blocking filter of claim 1, wherein an absolute value ($\Delta T_{30\%}$) of a difference between a wavelength W1 at which a transmittance value of light incident in the vertical direction is 50% in a wavelength range of 600 to 800 nm and a wavelength at which a transmittance value of light incident at an angle of 30° with respect to the vertical direction is 30% is less than or equal to 15 nm.

3. The near-infrared blocking filter of claim 1, which satisfies the following Mathematical Formula 3:

$$W2 - W1 < 20 \text{ nm} \quad \text{[Mathematical Formula 3]}$$

wherein W1 represents a wavelength at which the near-infrared reflection layer has a transmittance value of 50% with respect to light incident on the near-infrared blocking filter in the vertical direction in a wavelength range of 600 to 800 nm, and W2 represents a maximum-absorption wavelength of the light absorption layer.

4. The near-infrared blocking filter of claim 1, which satisfies the following Mathematical Formula 5:

$$\% \, T_{NIR\text{-}peak} < 10\% \quad \text{[Mathematical Formula 5]}$$

wherein $\% \, T_{NIR\text{-}peak}$ represents a maximum transmittance value in a wavelength range of 700 to 750 nm.

5. The near-infrared blocking filter of claim 1, wherein the near-infrared reflection layer is formed of a dielectric multilayer.

6. The near-infrared blocking filter of claim 5, wherein the near-infrared reflection layer further comprises a light absorbing agent dispersed in the dielectric multilayer.

7. An imaging device comprising the near-infrared blocking filter according to claim 1.

* * * * *